US006980423B2

(12) United States Patent  
Tanaka et al.

(10) Patent No.: US 6,980,423 B2
(45) Date of Patent: Dec. 27, 2005

(54) TABLET INTERLOCKING MECHANISM

(75) Inventors: Toshiyuki Tanaka, Laguna Niguel, CA (US); Hiroshi Nakamura, Tokyo (JP); Martin P. Riddiford, London (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 174 days.

(21) Appl. No.: 10/717,329

(22) Filed: Nov. 18, 2003

(65) Prior Publication Data  
US 2005/0105263 A1 May 19, 2005

(51) Int. Cl.⁷ ............................................ G06F 1/16
(52) U.S. Cl. ............... 361/683; 361/681; 248/917; 292/45; 292/251.5
(58) Field of Search ........ 361/679–683; 248/917–923; 312/223.1, 223.2; 292/42, 85, 91, 251.5

(56) References Cited

U.S. PATENT DOCUMENTS

| | | | |
|---|---|---|---|
| 5,268,817 A | 12/1993 | Miyagawa et al. | |
| 5,489,924 A * | 2/1996 | Shima et al. | 361/681 |
| 5,548,478 A | 8/1996 | Kumar et al. | 361/681 |
| 5,644,469 A * | 7/1997 | Shioya et al. | 361/681 |
| 5,949,408 A * | 9/1999 | Kang et al. | 345/169 |
| 6,094,341 A * | 7/2000 | Lin | 361/681 |
| 6,477,871 B1 | 11/2002 | Shaw et al. | |
| 6,483,445 B1 | 11/2002 | England | |
| 6,504,707 B2 | 1/2003 | Agata et al. | |
| 6,519,148 B2 | 2/2003 | Nakagawa et al. | |
| 6,707,665 B2 * | 3/2004 | Hsu et al. | 361/681 |
| 6,829,140 B2 * | 12/2004 | Shimano et al. | 361/683 |
| 6,842,338 B2 * | 1/2005 | Iredale | 361/683 |

FOREIGN PATENT DOCUMENTS

| | | |
|---|---|---|
| JP | 07-049725 | 2/1995 |
| JP | 10-055227 | 2/1998 |
| JP | 2000-228128 | 8/2000 |
| JP | 2002-222026 | 8/2002 |
| JP | 2003-044169 | 2/2003 |

* cited by examiner

Primary Examiner—Lisa Lea-Edmonds
(74) Attorney, Agent, or Firm—Blakley Sokloff Taylor & Zafman LLP

(57) ABSTRACT

An apparatus has a body having a channel. A display support member has a first end pivotally coupled to the body and a second end. A display housing has a bottom portion. The display housing is pivotally coupled to the second end of the display support member. A first latch member is coupled to the bottom portion of the display housing. The first latch member is adapted to be received by the channel and hold the display housing.

11 Claims, 4 Drawing Sheets

TABLET INTERLOCKING MECHANISM

FIELD

Embodiments of the invention generally relate to the field of flat panel displays.

GENERAL BACKGROUND

Over the past decade, there has been increased demand for notebook computers, especially in light of their enhanced data processing capabilities. Operating from either external or portable power sources, conventional notebook computers feature a display housing pivotally connected to a body. Typically, the display housing features a liquid crystal display (LCD) while the body features a keyboard and a secondary input device, such as a roller ball or a touch pad for example.

In order to access the keyboard and view the LCD, a user places the body on a surface (e.g., the user's lap or a stationary surface) and opens the notebook computer by pivoting the display housing in an upward angular direction away from the body. As a result, the user is able to access the keyboard and secondary input device as well as to read the displayed content from the LCD. To close and transport the notebook computer after use, the user pivots the display housing toward the body and secures the display housing. Such pivoting may be accomplished by a hinge attached to a rear surface of the body.

Due to the growing popularity of personal digital assistants and tablet computers, notebook computers are now being configured to alternatively operate as a tablet computer, with a stylus operating as the input device. This requires the display housing to be inverted, namely the LCD is positioned to face upward and to rest against the body.

Japanese Patent JP07-049725 discloses a notebook computer that can have the display screen in a key entry state or a pen input state. In the pen input state the display screen covers the keyboard. The display screen is generally parallel to and facing away from the keyboard. The display screen is supported by two arms that have offset hinge points causing the arms to move into a parallel relationship as the display is rotated between the key entry state and the pen input state. One of the arms is fitted with a cammed lock mechanism that operates to lock the arm when the display screen is either the key entry state or the pen input state thus holding the screen in either of those positions. The lock is released by rotation of the display screen to permit movement to the alternate screen positions.

Known electronic devices that allow the display to be pivoted to an alternate position for tablet type use may have various disadvantages. For instance, one disadvantage is that conventional display housings may employ two independent locking mechanisms, such as a pair of locking pins to preclude rotation of the LCD and a lock to attach the display housing to the body casing. This may make the locking/unlocking procedure cumbersome. Moreover, independent locking mechanisms may increase overall manufacturing costs and increase the potential likelihood of a structural failure.

BRIEF DESCRIPTION OF THE DRAWINGS

Features and advantages of embodiments of the invention will become apparent from the following detailed description in which.

DETAILED DESCRIPTION

Embodiments of the invention set forth in the following detailed description generally relate to an interlocking mechanism for a flat panel display that provides dual fastening capabilities. Herein, at least one embodiment of the invention relates to an interlocking mechanism that enables a bottom portion of a display housing to become attached to a display support member of an electronic device in a first configuration and to become attached to a body of the electronic device in a second configuration.

In the following description, certain terminology is used to describe certain features of one or more embodiments. For instance, an "electronic device" is defined as a product with a flat panel display. In this detailed description, for clarity sake and for illustrative purposes only, the electronic device will be illustrated as a portable computer that can be alternatively converted between a notebook computer and a tablet computer. Embodiments of the invention may be utilized in a variety of electronic devices including, but not limited or restricted to personal digital assistants, cellular telephones, digital cameras, video cameras, navigation systems, and the like.

Herein, terms of geometric orientation and relationship such as "up," "down," "front," "back," "top," "bottom," "vertical," and "horizontal" are used in a conventional sense as would be applied to a particular device in a typical operating orientation or as may be shown in the Figures. It will be appreciated that embodiments of the invention may be used with small, portable devices that may be readily placed in any of a wide variety of overall orientations and that such devices may have more than one typical operating orientation. Changes in the overall orientation of a device will, of course, alter the terms of geometric orientation and relationship that would be applied to the device in any given overall orientation. Terms of geometric orientation and relationship are used herein for clarity of description and should not be read as restrictive on the broad aspects of various embodiments of the invention.

Herein, the terms "rotate," "pivot," as well as varying tenses thereof are generally defined as an angular movement about an axis of rotation. The axis of rotation may be fixed relative to the overall orientation of the device. For this detailed description, the terms "vertically pivoted" (or any tenses thereof) generally relates to a rotation along a substantially horizontal axis of rotation. The term "horizontally pivoted" (or any tense thereof) generally relates to a rotation along a substantially vertical axis of rotation.

Figure 1:
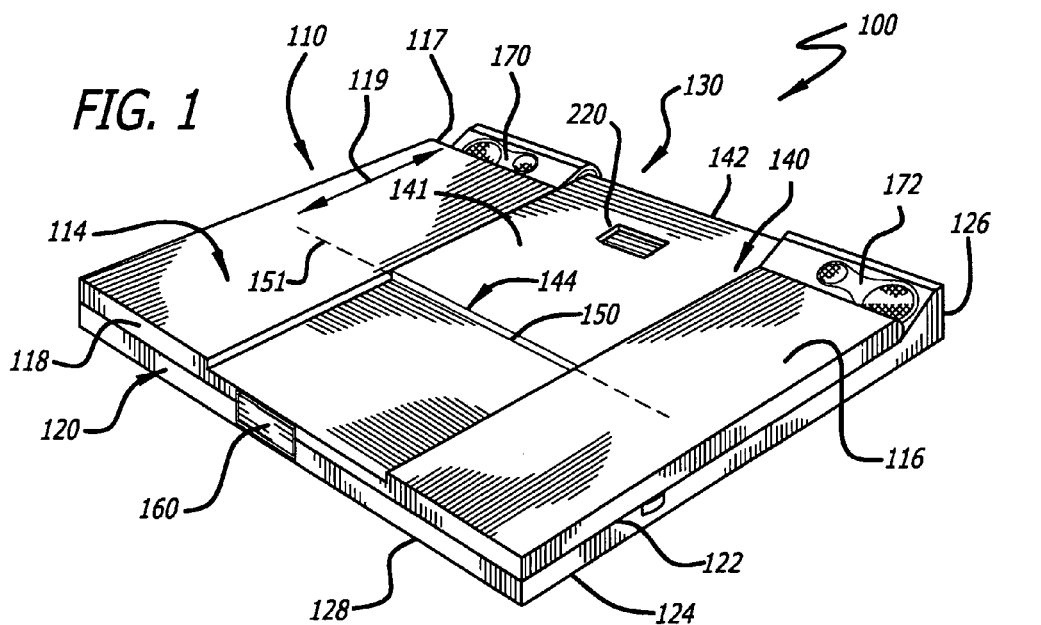
FIG. 1 is a perspective view of an exemplary embodiment of an electronic device placed in a CLOSED position.
Figure 2:
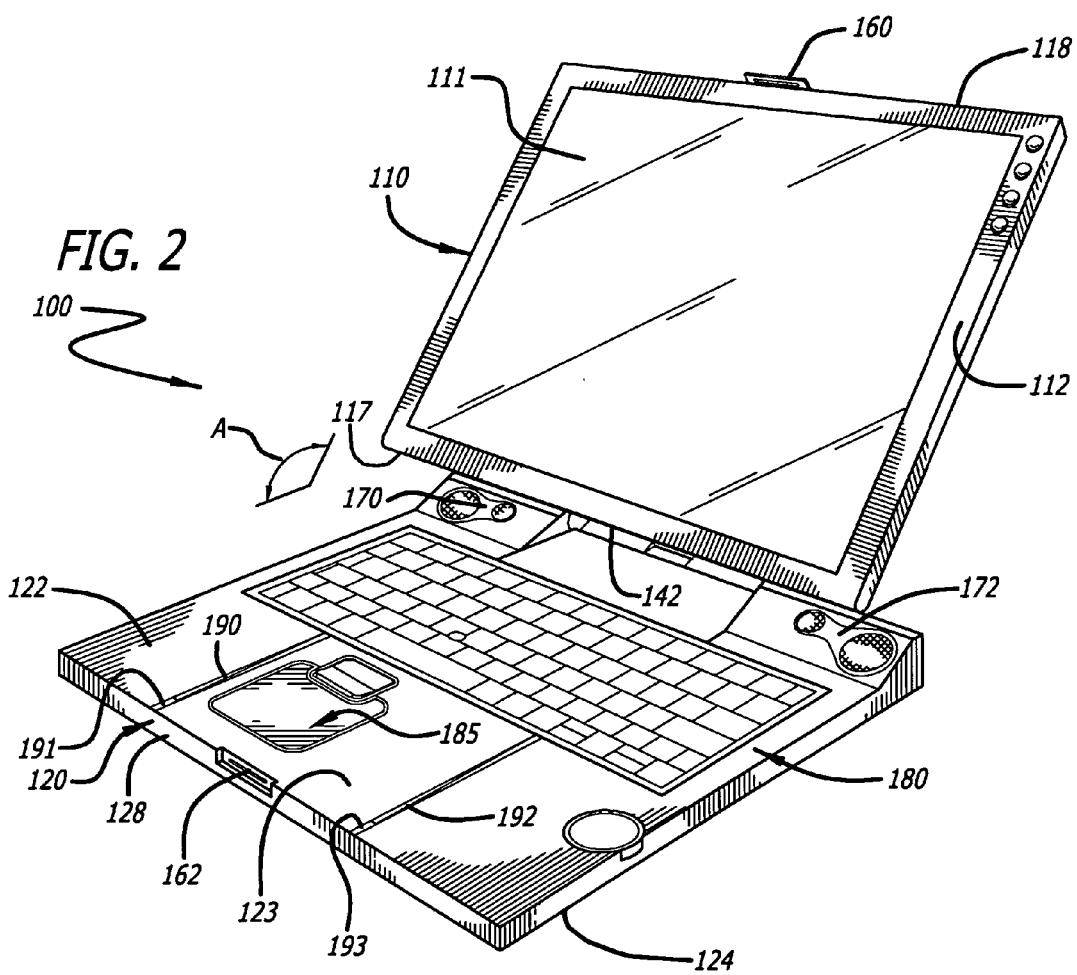
FIG. 2 is a perspective view of the electronic device of FIG. 1 when placed in a NOTEBOOK position.
Figure 3:
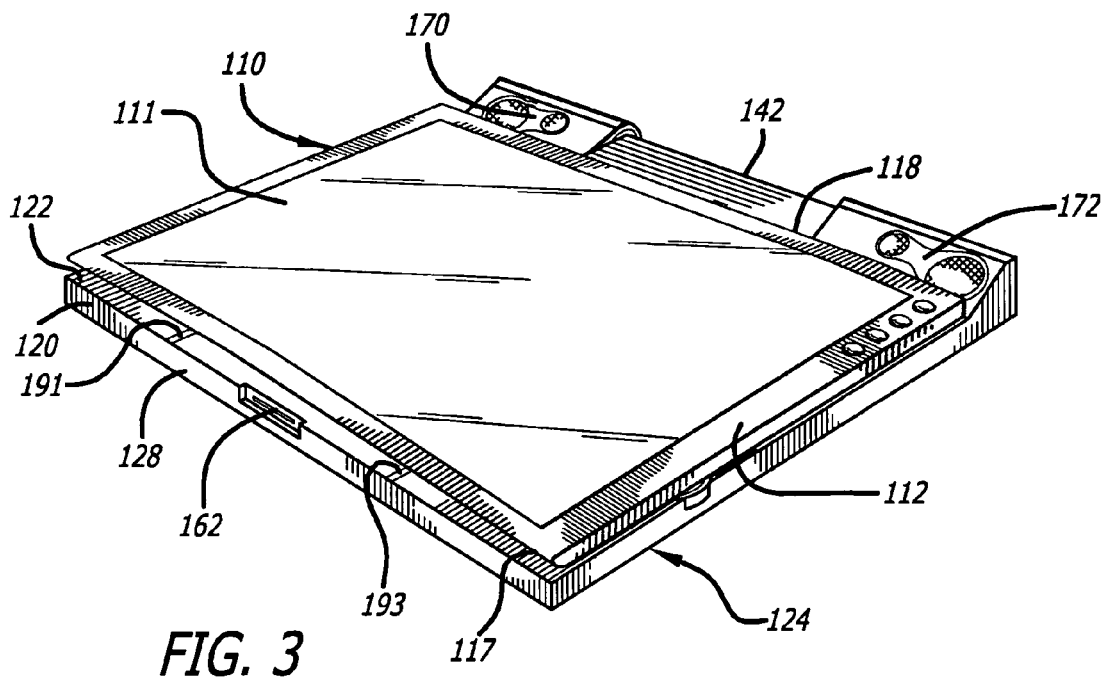
FIG. 3 is a perspective view of the electronic device of FIG. 1 when placed in a TABLET position.

FIGS. 1–3 illustrate perspective views of an exemplary electronic device 100 placed in various positions. In particular, FIG. 1 shows a perspective view of an exemplary electronic device 100 placed in a CLOSED position. FIG. 2 shows a perspective view of the electronic device 100 placed in a NOTEBOOK position. FIG. 3 shows a perspective view of the electronic device 100 placed in a TABLET position wherein the back display panel 114 of the display housing 110 is adjacent the front panel section 122 of the body 120. The features and components of the electronic device 100 will be referenced based on a collective review of FIGS. 1–3.

Implemented with an embodiment of an interlocking mechanism as described below, electronic device 100 comprises a display housing 110 that is pivotally coupled to a body 120 through a first and second hinge assemblies 130, 150 and a display support member 140. It is contemplated that different areas of the display housing 110 and the body 120 may be of different materials. For example, a portion 123 of a front panel section 122 of the body 120 surrounding a secondary input device 185 may be of stainless steel or another metal composition rather than hardened plastic to improve durability in prolonged use.

In one embodiment of the invention, the body 120 may comprise two main panel sections, namely the front panel section 122 and a back panel section 124. These panel sections 122, 124 may be brought together to enclose hardware components and stored software of the electronic device 100. This provides protection against foreign materials and environmental conditions. In this embodiment, the panel sections 122, 124 may be made of non-pliable material such as hardened plastic. The body 120 has a bottom edge 126 and an opposing top edge 128.

The electronic device 100 may further comprise a keyboard 180 integrated into the body 120. A secondary input device 185, such as a touch pad or a track ball for example, may be integrated into the body 120 as well. In one embodiment of the invention, dual speakers 170 and 172 may be integrated into the body 120 adjacent the bottom edge 126 and separated by the display support member 140. The speakers 170, 172 may be substantially visible when the display housing 110 is placed in the CLOSED position.

The display support member 140 has a first end 142 and an opposing second end 144. A first hinge assembly 130 may pivotally couple the first end of the display support to the body 120 adjacent the bottom edge 126. In one embodiment of the invention, the first hinge assembly 130 may be configured to pivotally couple the bottom edge 126 of the body 120 and the first end 142 of the display support member 140.

The display support member 140 may be coupled adjacent to the bottom edge 126, meaning that the first hinge assembly 130 may rotate about a substantially horizontal axis of rotation that is in the plane of the bottom edge 126 or somewhat forward or backward from that plane.

In one embodiment of the invention, the axis of rotation for the first hinge assembly 130 may be several inches forward of the bottom edge 126. This may provide a rear portion of the body between the horizontal axis of rotation of the first hinge assembly 130 and the bottom edge 126 of the body 120. The rear portion of the body may accommodate some of the hardware components in the body 120, for example speakers 170, 172.

In one embodiment of the invention, the first hinge assembly 130 may provide a brake mechanism, such as a torsion bar mechanism or a frictional hinge, in order to maintain display housing 110 at a selected angle of rotation above body 120 when the device 100 is opened in NOTEBOOK position. For instance, the first hinge assembly 130 may be adapted to maintain display housing 110 at an angle A, where "A" typically ranges between approximately 30 degrees and 150 degrees (see FIG. 2).

The display housing 110 houses a flat panel display 111. In one embodiment of the invention, the display housing 110 may also house all or part of the circuitry for generating a displayable image on the flat panel display 111. Examples of flat panel displays 111 include, but are not limited or restricted to a liquid crystal display (LCD), a plasma display, or the like.

The display housing 110 may comprises two panel sections coupled together. These panel sections may include a front display panel 112 and a back display panel 114. The flat panel display 111 may be housed such that a display surface of the flat panel display 111 is visible in the front display panel 112 of the display housing 110.

Herein, the display housing 110 has a top edge 118, which is the edge that is substantially adjacent the top edge 128 of the body 120 when the display housing 110 is placed in the CLOSED position (FIG. 1). Moreover, the flat panel display 111 is adjacent the front panel section 122 of the body 120.

When the display housing is placed in the CLOSED position (FIG. 1) or in the NOTEBOOK position (FIG. 2), the display housing 100 has a bottom edge 117 situated substantially adjacent to the bottom edge 126 of the body 120.

Alternatively, the bottom edge 117 of the display housing 110 may be placed substantially adjacent the top edge 128 of the body 120 when the display housing 110 is placed in the TABLET position (FIG. 3). In the TABLET position the back display panel 114 is adjacent the front panel section 122 of the body 120.

Figure 4:
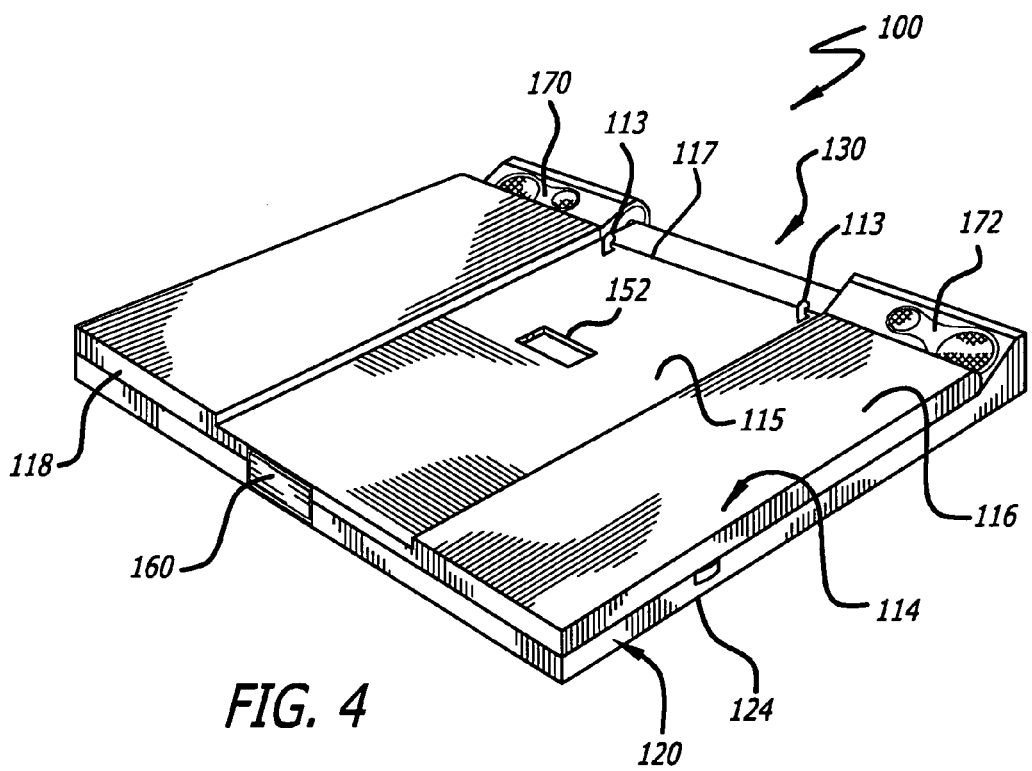
FIG. 4 is a perspective view of the electronic device of FIG. 1 in the CLOSED position without the display support member.

FIG. 4 is a perspective view of the electronic device 100 of FIG. 1 in the CLOSED position without the display support member 140 to allow certain aspects of the display housing 110 to be illustrated. The back display panel 114 may include a recessed area 115 that is sized to accommodate the display support member 140 (not shown). This recessed area 115 enables a top surface 116 of back display panel 114 to be substantially coplanar with a top surface 141 of the display support member 140 when the electronic device 100 is in the CLOSED position (see FIG. 1).

As shown in FIG. 1, second hinge assembly 150 may pivotally couple the second end 144 of the display support member 140 to the display housing 110. In one embodiment of the invention, the second hinge assembly 150 may be generally positioned adjacent a longitudinal center 151 of the back display panel 114 of the display housing 110, meaning that the second hinge assembly 150 may rotate about a substantially horizontal axis of rotation that is approximately equidistant from the back edge 117 and the front edge 118 of the display housing 110. The axis of rotation may be in the plane of the back display panel 114 or somewhat above or below that plane.

The portion of the display housing 110 between the longitudinal center 151 established by the second hinge assembly 150 and the first hinge assembly 130 is referred to as the "bottom portion" 119 of the display housing 110. The second hinge assembly 150 enables the display housing 110 to be vertically pivoted around the horizontal axis of rotation established by the second hinge assembly 150. The second hinge assembly 150 may be a friction hinge, a collection of friction hinges, or one or more hinges without a brake mechanism.

Returning back to FIG. 4, the back display panel 114 may comprise a recessed portion 152 adapted to receive the second hinge assembly 150. The recessed portion 152 may be in the recessed area 115.

As further shown in FIG. 4, the display housing 110 may comprise one or more first latch members 113, such as latch hooks, coupled to the back display panel 114 adjacent the bottom edge 117. The first latch members 113 may be positioned within the recessed area 115.

Figure 5A:
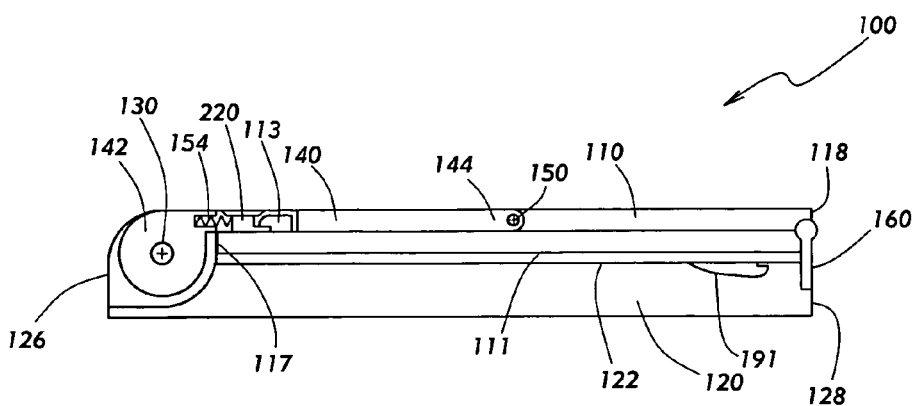
FIG. 5A is a schematic cross-section of an exemplary embodiment of the electronic device of FIG. 1 placed in a CLOSED position.
Figure 5B:
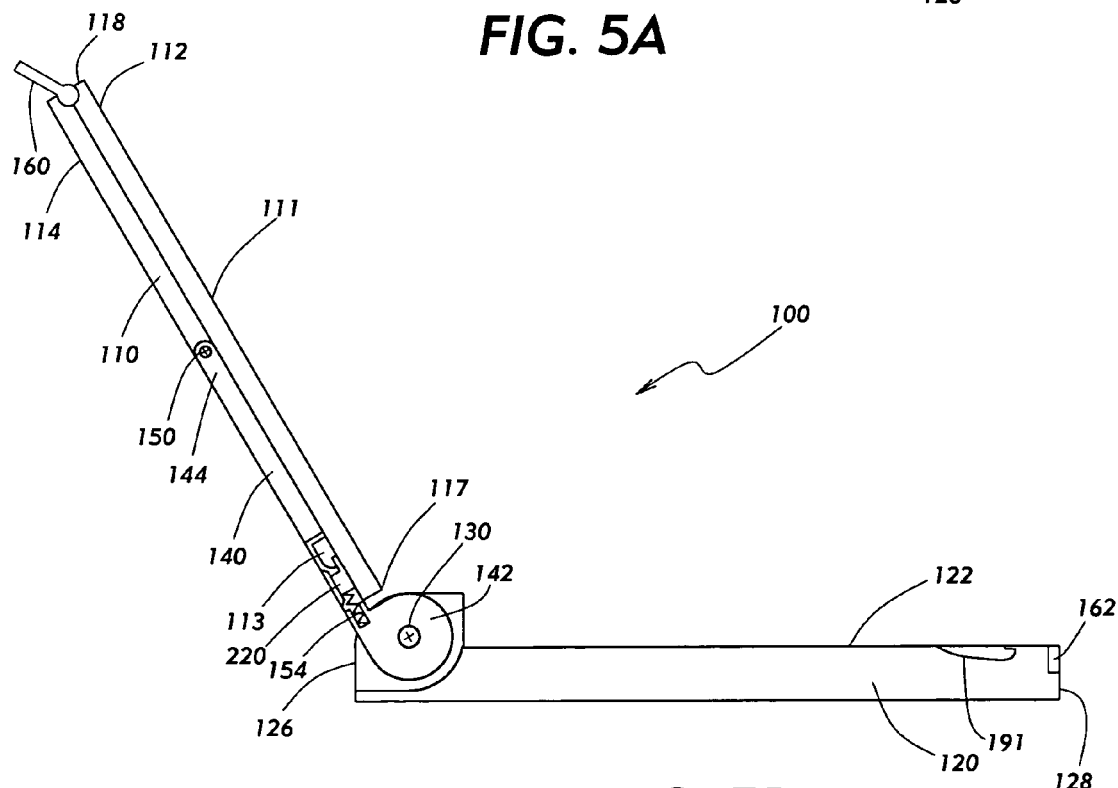
FIG. 5B is a schematic cross-section of the electronic device of FIG. 5A when placed in a NOTEBOOK position.
Figure 5C:
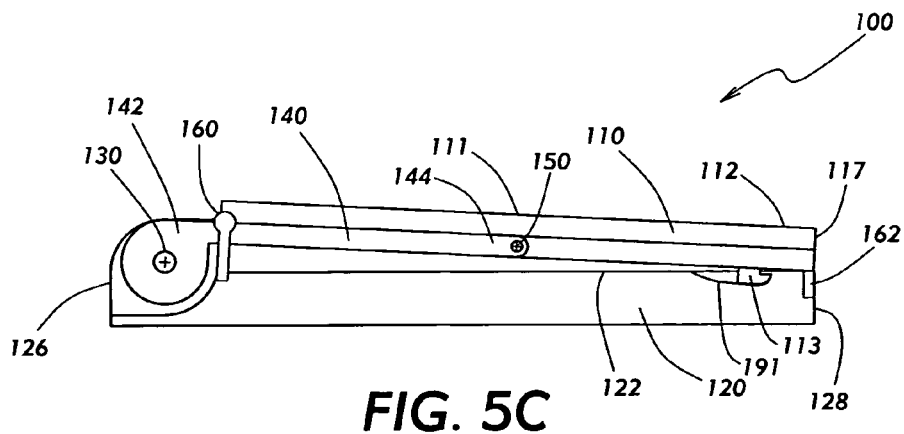
FIG. 5C is a schematic cross-section of the electronic device of FIG. 5A when placed in a TABLET position.

The arrangement of the display support member 140 and the hinge assemblies 130, 150 may permit the display housing 110 to be placed in various configurations with respect to the body 120. FIG. 5A is a schematic cross-section that shows the display housing 110 placed in the CLOSED position. FIG. 5B is a schematic cross-section that shows the display housing 110 placed in the NOTEBOOK position. FIG. 5C is a schematic cross-section that shows the display housing 110 placed in the NOTEBOOK position. The features and components of the electronic device 100 will be referenced based on a collective review of FIGS. 5A–5C.

As shown in FIG. 5A, the display support member 140 may comprise one or more second latch members 220 coupled to the display support member 140 adjacent the first end 142. Each first latch member 113 may engage one of the second latch members 220 to couple the display housing 110 to the support member 140 and prevent rotation of the second hinge assembly 150. This provides a first configuration of the device 100 in which the display housing 110 may be moved from the CLOSED position (FIG. 5A) to the NOTEBOOK position (FIG. 5B) by rotating the display support member 140 and the coupled display housing 110 about the first hinge assembly 130.

A first storage latch member 160 may be provided on the display housing 110 adjacent the top edge 118. A second storage latch member 162 may be provided on the body 120 adjacent the top edge 128. The first storage latch member 160 may be coupled to the second storage latch member 162 prevent rotation of the first hinge assembly 130 and maintain the device 100 in the CLOSED position as shown in FIG. 5A. The first storage latch member 160 may be uncoupled from the second storage latch member 162 to permit rotation of the first hinge assembly 130 and to allow the device 100 to be opened to the NOTEBOOK position as shown in FIG. 5B. In one embodiment of the invention, the first storage latch member 160 may be rotatable as shown in FIG. 5B.

The first latch member 113 may be uncoupled from the second latch member 220 to permit rotation of the first hinge assembly 130 and to allow the device 100 to be placed in the TABLET position as shown in FIG. 5C. In one embodiment of the invention, the second latch member 220 may comprise a slidable button with a resilient member 154, such as a spring, to urge the second latch member toward a position that engages the first latch member 113. The slidable button may be moved in opposition to the resilient member 154 to uncouple the first latch member 113.

The body 120 may comprise one or more receiving portions 191 included in the front panel section 122 adjacent the top edge 128. In one embodiment of the invention, one or more channels 190, 192 are formed on the front panel section 122 (see FIG. 1). Each channel 190, 192 includes a recessed area for the receiving portions 191, 193 where one of the receiving portions is further shown in FIGS. 5A–D. As shown in FIG. 5C, the first latch member 113 may engage the receiving portion 191 when the device 100 is opened to the TABLET position.

Figure 5D:
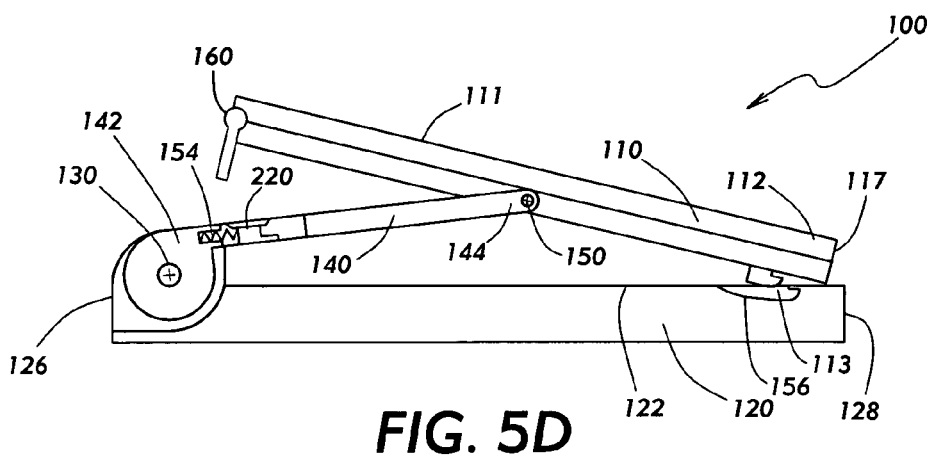
FIG. 5D is a schematic cross-section of the electronic device of FIG. 5A engaging or disengaging the latch mechanism for a TABLET position.

As shown in FIG. 5D, the display housing 110 may require a substantial rotation away from the TABLET position before the first latch member 113 may move sufficiently away from the receiving portion 191 to uncouple the first latch member 113 and allow the display housing to move freely away from the body. In this way, the first latch member 113 may be reliably coupled to the receiving portion 191 without requiring the first latch member or the receiving portion to be independently movable.

In one embodiment of the invention, the first storage latch member 160 may be rotatable to engage a third storage latch member (not shown) coupled to the body adjacent the bottom edge 126, as shown in FIG. 5C. Coupling the first storage latch member to the third storage latch member may further secure the display housing 110 when the device 100 is in the TABLET position. The rotation of the first storage latch member 160 may provide an unobstructed surface on the front display panel 112 in the TABLET position.

Figure 6A:
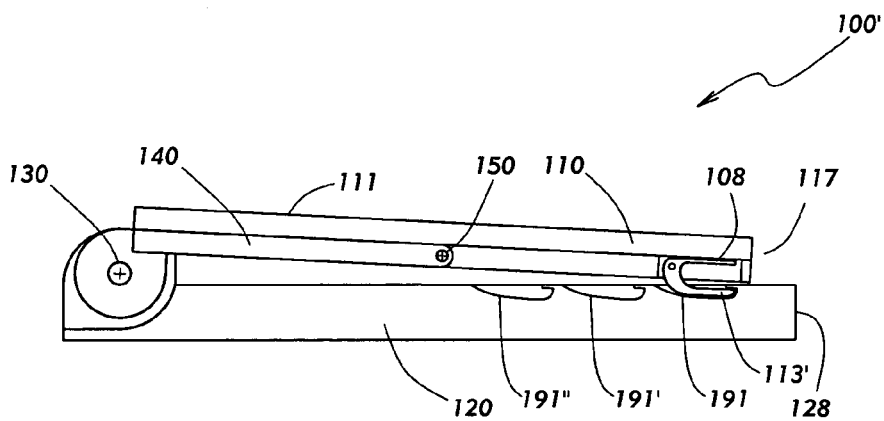
FIGS. 6A and 6B are schematic cross-sections of another embodiment of an electronic device having multiple TABLET positions.
Figure 6B:
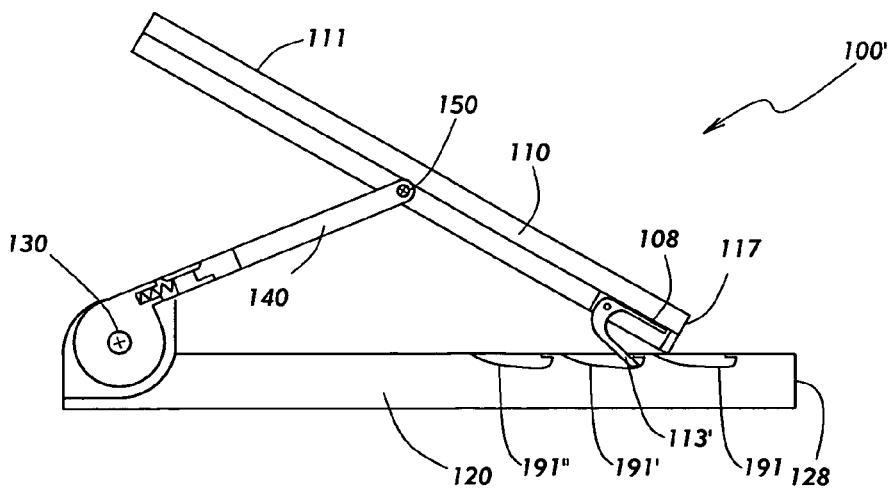

In one embodiment of the invention, two or more receiving portions, for example three receiving portions 191, 191', 191" may be provided for each first latch member 113'. The additional receiving portions 191', 191" may be placed a successively greater distances from the top edge 128 of the body 120. This may permit the display housing 110 to be secured at various angles relative to the body 120 when the device is in the TABLET position as shown in FIGS. 6A and 6B. This may allow the display housing 110 to be coupled to the groove 190 on the front panel section 122 of the body 120 with the display housing at any of at least two inclined positions.

In one embodiment of the invention, the first latch member 113' may be a pawl mechanism that permits the first latch member to adapt to two or more receiving portions 191, 191', 191" with the display housing rotated by different amounts when engaged with each of the receiving portions. A resilient member 118 may urge the pawl mechanism 113' to rotate away from the display housing 110 to facilitate engagement in the various receiving portions 191, 191', 191". The resilient first latch member 113' may allow the first latch member to deflect when not engaged with a matching latch member.

While certain exemplary embodiments have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible.

What is claimed is:

1. An apparatus comprising:
 a body having a channel;
 a display support member having a first end pivotally coupled to the body and a second end;
 a display housing having a bottom portion, the display housing pivotally coupled to the second end of the display support member; and
 a first latch member coupled to the bottom portion of the display housing, the first latch member adapted to be received by the channel and hold the display housing.

2. The apparatus according to claim 1, wherein the channel includes a plurality of receiving portions which receives the first latch member for holding the display housing at any of at least two inclined positions.

3. The apparatus according to claim 1, wherein the display support member includes a second latch member which engages with the first latch member to couple the display housing to the support member.

4. The apparatus according to claim 1, wherein the first latch member is a rotatable pawl mechanism.

5. The apparatus according to claim 4, wherein the rotatable pawl mechanism includes a resilient member to urge the pawl mechanism to rotate away from the display housing.

6. An apparatus comprising:
a body having an upper surface in which a plurality of receiving portions are provided;
a display support member having a first end pivotally coupled to the body and a second end;
a display housing having a bottom edge, the display housing pivotally coupled to the second end of the display support member; and
a first latch member provided in the bottom edge of the display housing, the first latch member being engaged to the display support member to prevent rotation of the display housing, and being engaged to one of the plurality of the receiving portions for holding the display housing at any of at least two inclined positions.

7. The apparatus according to claim 6, wherein the display support member includes a second latch member which engages with the first latch member to couple the display housing to the display support member.

8. The apparatus according to claim 6, wherein the first latch member is a rotatable pawl mechanism.

9. The apparatus according to claim 8, wherein the rotatable pawl mechanism includes a resilient member to urge the pawl mechanism to rotate away from the display housing.

10. An apparatus, comprising:
a body having a first receiving portion and a second receiving portion;
a display support member having a first end pivotally coupled to the body and a second end;
a display housing having an upper edge and a bottom edge, the display housing coupled to the second end of the display support member between a first position where the bottom edge is near the display support member and a second position where the bottom edge is separated from the display support member;
a first latch member provided to the bottom edge of the display housing, the first latch member being engaged to the display support member when the display housing is in the first position, and being engaged to the first receiving portion when the display is in the second position;
a second latch member provided to the upper edge of the display housing, the second latch member being engaged to the second receiving portion when the display housing is in the second position and the display support member is overlapped on the body.

11. The apparatus according to claim 10, wherein the first receiving portion includes a plurality of receiving portions for holding the display housing at any of at least two inclined positions.

* * * * *